United States Patent [19]

von Gunten et al.

[11] Patent Number: 4,615,034

[45] Date of Patent: Sep. 30, 1986

[54] ULTRA-NARROW BANDWIDTH OPTICAL THIN FILM INTERFERENCE COATINGS FOR SINGLE WAVELENGTH LASERS

[75] Inventors: Marc K. von Gunten; Benjamin H. Cook, both of San Jose; David C. Gerstenberger, Mountain View, all of Calif.

[73] Assignee: Spectra-Physics, Inc., San Jose, Calif.

[21] Appl. No.: 595,296

[22] Filed: Mar. 30, 1984

[51] Int. Cl.$^4$ .................................................. H01S 3/08
[52] U.S. Cl. ........................................ 372/99; 372/55; 372/108; 372/23; 350/166
[58] Field of Search ...................... 372/99, 55, 23, 108, 372/98; 350/166, 164

[56] References Cited

U.S. PATENT DOCUMENTS

| 4,009,453 | 2/1977 | Mahlein | 378/99 |
| 4,099,840 | 7/1978 | van der Wal et al. | 372/99 |
| 4,132,959 | 1/1979 | Bouwhuis et al. | 372/99 |
| 4,201,954 | 5/1980 | van der Wal et al. | 372/99 |
| 4,340,969 | 7/1982 | Hamilton et al. | 372/99 |

FOREIGN PATENT DOCUMENTS 1198933  8/1965  Fed. Rep. of Germany ........ 372/99

OTHER PUBLICATIONS

Matsuda et al; "Air-cooled Argon-ion Laser"; Toshiba Rev., No. 124, Nov.-Dec. 1979.
Kulagin et al; "A Pulsed Laser Employing Ar+ Ions at High Currents and Low Pressures"; Zhur. Prik. Spek., vol. 5, No. 4, p. 534, 1966.

Primary Examiner—Leon Scott, Jr.
Attorney, Agent, or Firm—Donald C. Feix

[57] ABSTRACT

A wavelength selective mirror provides single wavelength operation of a gas laser. In a specific embodiment an output coupler optical interference coating allows oscillation of the 488.0 nanometer line of the Argon ion laser blue/green spectrum while suppressing all other lines in that spectrum, particularly adjacent lines at 476.5 nanometers and 496.5 nanometers.

15 Claims, 11 Drawing Figures

FIG. 1

THE COMPUTED SPECTRAL CURVE OF THE WAVELENGTH SELECTIVE OUTPUT COUPLER COATING FOR OSCILLATION OF THE ARGON ION LASER 488.0nm SPECTRAL LINE ONLY. ARGON ION LASER LINES IN THE BLUE/GREEN SPECTRUM ARE SHOWN ABOVE THE GRAPH. THE COATING IS CENTERED AT 486.5nm.

GRAPHICAL REPRESENTATION OF EQUATION 2 PLOTTING THE BANDWIDTH OF THE REFLECTANCE ZONE OF A QUARTER WAVE OPTICAL THICKNESS STACK VERSUS THE RATIO OF THE REFRACTIVE INDEX OF THE HIGH INDEX LAYER TO THE REFRACTIVE INDEX OF THE LOW INDEX LAYER.

FIG. 3

SPECTRAL REFLECTIVITY OF A HIGH REFLECTOR STACK $(HL)^N H$ ILLUSTRATING HIGHER ORDER REFLECTANCE ZONES. THE FUNDAMENTAL ZONE OCCURS AT $\lambda_0/\lambda = 1$

ULTRA-NARROW BANDWIDTH OPTICAL THIN FILM INTERFERENCE COATINGS FOR SINGLE WAVELENGTH LASERS

BACKGROUND OF THE INVENTION

This invention relates generally to lasers and optical thin film interference filters for providing narrow wavelength bandwidth operation of a laser.

This invention has specific application to wavelength selective optical elements for narrow wavelength bandwidth or single wavelength operation of a gas laser.

Many applications of lasers require single wavelength operation of the laser device. The Argon ion laser, which is used in laser reprographic systems for example, can oscillate on a number of lines in the 450 nanometer to 520 nanometer spectral region simultaneously. Traditionally, a single wavelength is selected in the laser by introducing a wavelength selective optical element, such as a prism or birefringent filter, into the optical cavity.

Alternatively, the laser device can be run at a low input power level such that only a single line is above threshold.

The above described techniques are deemed unacceptable in many instances.

Laser cavities with prisms or birefringent filters are significantly more difficult to align and to maintain in alignment than cavities with mirrors only. Also, complex methods to compensate for thermal changes in refractive index must be employed to stabilize lasers that utilize prisms and operate over a wide range of temperatures.

The second method referred to above, running the laser at low input power level to obtain a single line, unnecessarily limits the single wavelength laser output power. Also, it allows virtually no selection of the line which oscillates, as nominally the highest gain line comes to threshold first.

It is a primary object of the present invention to obtain single wavelength or selected narrow wavelength bandwidth operation of a laser by apparatus and methods which avoid the problems of the prior art.

It is a related object to obtain single wavelength operation of a laser by using a laser mirror having an optical coating constructed to reflect over a sufficiently narrow bandwidth as to be effective to select the preferred operating wavelength.

SUMMARY OF THE INVENTION

In accordance with the present invention single wavelength or narrow wavelength bandwidth operation of a laser is obtained by using a laser mirror with sufficiently narrow bandwidth optical coatings to select the preferred operating wavelength or wavelength range.

Mirrors with ultra-narrow bandwidth coatings have several advantages as compared to prior art, single wavelength selecting apparatus and methods.

Said mirrors can be less expensive to fabricate than prisms or birefringent plates.

Said mirrors are much easier to mount mechanically than either birefringent plates or prisms.

Said mirrors will undergo significantly less shifting in wavelength selectivity with changes in temperatures and thus will not require bimetallic compensation.

Said mirrors are also significantly easier to align and to adjust in lasers with internal optics than are other wavelength selective components.

One of the severest situations for wavelength selective mirrors in practical Argon ion lasers exists for the three laser lines at 476.5 nanometers, 488.0 nanometers and 496.5 nanometers. The 488.0 nanometer line has the highest gain and for low power (20 mW) versions of the Argon ion laser, the highest output power. Wavelength selective output mirrors designed to facilitate oscillation only on this line in accordance with one specific embodiment of the present invention provide approximately 2% transmission at 488.0 nanometers and sufficient transmission at 476.5 nanometers and 496.5 nanometers to suppress oscillation on these lines. For typical 20 milliwatt Argon ion lasers, transmissions greater than 15% at 476.5 nanometers and 10% at 496.5 nanometers are adequate.

In the prior art, laser mirrors have been made of dielectric materials of alternating quarter wave optical thickness high and low refractive index layers, but the common materials used for these layers have yielded bandwidth zones which were too wide to support laser oscillation in the Argon ion blue/green spectrum at one given spectral line while completely suppressing all adjacent lines. A typical high index material used in the prior art was Titanium Dioxide with a refractive index of 2.35 (@500.0 nanometers). A typical low index material was Silicon Dioxide with a refractive index of 1.45 (@500.0 nanometers. Reflective multilayer stacks fabricated from these dielectric materials were not effective to function as selective optical elements for single line operation of the laser.

The present invention embodies one or more mirrors which are effective to accomplish single wavelength or narrow bandwidth selection.

The method and apparatus of the present invention comprise a conventional laser gain medium, such as (but not limited to) an Argon, Krypton, Helium-Neon or other gas, discharge tube coupled with an optical cavity comprising two or more mirrors. At least one of the mirrors has sufficiently narrow spectral characteristics to support laser oscillation on one line and to suppress laser oscillation on all other lines. Any one or all mirrors may be wavelength selective including reflectors, high reflectors and output couplers. A wavelength selective ouput coupler may also be placed at both ends of a two mirror cavity or comprise several mirrors in a multi-mirror cavity. Many combinations exist with wavelength selective coatings and standard bandwidth coatings as either high reflectors or output couplers.

In one specific embodiment of the present invention, multiple alternating layers of Aluminum Oxide (having a refractive index of approximately 1.676 at 488.0 nanometers) and Silicon Dioxide (having a refractive index of approximately 1.448 at 488.0 nanometers) are used on BK-1 optical glass to provide single line operation of an Argon ion laser at 488.0 nanometers while suppressing oscillation at the adjacent 476.5 nanometers and 496.5 nanometers lines and other lines in the Argon ion blue/green spectrum. In this embodiment the coating allows oscillation at the 488.0 nanometers line by providing high optical reflectivity and low optical transmission through the mirror at that wavelength and suppresses oscillation at the 476.5 nanometers line and 496.5 nanometers line and other lines in the Argon ion blue/green spectrum by providing the necessary optical transmission through the mirror in order to suppress oscillation at those wavelengths.

The coating of the present invention thus reflects over a fairly narrow bandwidth to allow oscillation at the selected line while being effective to suppress oscillation over all other lines and in particular over closely spaced adjacent lines.

The materials used for the coating of the present invention are dielectric materials which can survive the sustained high temperatures required for hard sealing the mirror to the end of the cavity of the gas laser without fracture, craze, peeling, re-evaporation from the substrate or other degradation to the optical characteristics of the coating. The hard sealing capability of this mirror is very unique. In general, mirrors with thick coatings or many layers tend to craze, crack, or peel under high temperature stresses produced by the mirror frit cycles. Other dielectric materials such as other oxides or fluorides may also be utilized. However, choices are limited due to the requirements as discussed elsewhere in this specification.

The dielectric materials of the coating of the present invention can also survive the vacuum environment and the hard ultra-violet radiation coming from the arc discharge in plasma tubes of gas ion lasers without change of the stoichiometry (crystal structure or chemistry) of the coating in part due to the low ultraviolet wavelength absorption edge.

The method and apparatus of the present invention may also be utilized in an "open cavity" configuration where the mirrors are separated from the direct plasma discharge environment by Brewster windows or the like. This invention may also be utilized in dye lasers, ring dye lasers, or solid state lasers wherever limited wavelength ranges or individual spectral lines are desired.

The coating stack comprising individual layer thicknesses of the coating design may be periodic or aperiodic. Individual layer thicknesses depend upon the required theoretical structure and the bandwidth required to suppress oscillation of adjacent spectral lines. These concepts are detailed in the description of the preferred embodiments.

Wavelength selective mirror apparatus and methods which incorporate the structures and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a side elevation view of a mirror for a laser constructed in accordance with one embodiment of the present invention. The mirror shown in FIG. 1 has an output coupler optical interference coating which will allow oscillation of the 488.0 nanometer line of the Argon ion laser blue/greeen spectrum while suppressing all other lines in that spectrum, particularly the adjacent lines at 476.5 nanometers and 496.5 nanometers. The coating layers are shown much exaggerated in FIG. 1 for purposes of illustration, and the major part of the central portion of the coating stack has been broken away to reduce the overall vertical height of the drawing FIG. 1.

FIG. 6 illustrates one means of several which are available by employing combinations of internal and external mirror surfaces, or cathode or anode ends for the wavelength selective mirror or one or more mirrors with wavelength selective properties.

DESCRIPTION OF THE PREFERRED EMBODIMENTS

The present invention is directed to a reflecting mirror for a laser of the kind which can oscillate on a number of lines simultaneously.

The reflecting mirror of the present invention has an output coupler optical interference coating which reflects over a fairly narrow bandwidth and which provides sufficiently narrow spectral characteristics to support laser oscillation on one line and to suppress laser oscillation on all other lines.

The wavelength selective mirror of the present invention is used with a conventional laser gain medium and has particular application to use as an internal, end mirror for the optical cavity of an Argon ion gas laser in which the reflecting mirror surface is exposed to the plasma environment within the cavity of the Argon ion gas laser.

Figure 1:
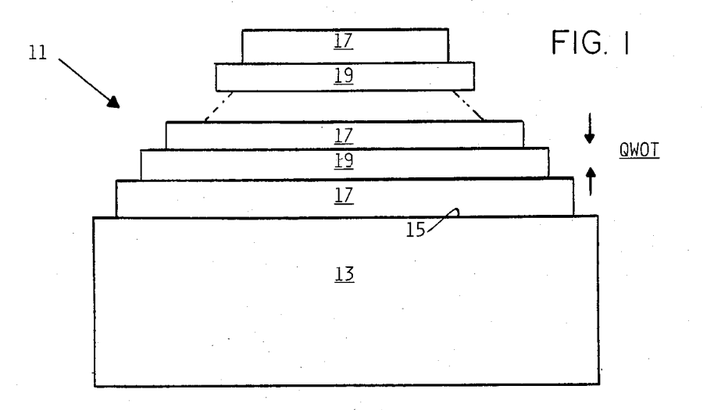

FIG. 1 shows one embodiment of an end mirror constructed in accordance with the present invention and used as one of the reflecting mirrors for an Argon ion laser constructed for single line operation on the 488.0 nanometer line.

The wavelength selective mirror shown in FIG. 1 is indicated generally by the reference numeral 11.

The mirror comprises an optical glass 13, which in the specific embodiment illustrated is BK-1 optical glass.

The mirror 11 shown in FIG. 1 is a mirror having a surface 15. The surface 15 is coated with layers 17 and 19 of dielectric materials having alternating high and low refractive index values.

The thickness of the coating layers has been greatly exaggerated for purposes of illustration, and the central part of the stack has been broken away, as indicated in FIG. 1, to simplify the showing.

The mirror shown in FIG. 1 provides single wavelength operation by providing high optical reflectance and low optical transmittance of light over a fairly narrow bandwidth at the desired operating line and suppresses oscillation at the other closely spaced adjacent lines by providing the necessary optical transmittance and reflectance of light in order to suppress oscillation at the wavelengths corresponding to the other closely spaced adjacent lines—as will now be described in more detail below.

The thin film coating of the present invention utilizes two basic concepts of optical interference filters.

The following basic descriptions and concepts deal with multilayer stacks of alternating high and low refractive index, non-absorbing dielectric layers. Each layer being a quarter-wave in optical thickness where the quarter wave optical thickness equals the number 4 multiplied by the index of refraction multiplied by the physical thickness of the layer (QWOT=4nt).

First, it is known that multilayer stacks of alternating layers of high and low refractive index values, ($n_h$ and $n_l$, respectively) where $n_h$ is approximately equal to $n_l$ reflect over a fairly narrow bandwidth.

Secondly, the wavelength bandwidth of such stacks is a function of the order (fundamental or higher order) of the reflectance zone, and to a lesser extent the optical thickness of each individual layer.

From basic thin film theory it is known that if the stack has high refractive index outer layers, and if the reflectance (R) is high, then to a first approximation the transmittance (T) of such stack is given by:

$$T = 1 - R \approx 4(n_l/n_h)^{2N}(n_s/n_h^2). \quad (1)$$

where:
$n_l$=index of refraction of the low index layer
$n_h$=index of refraction of the high index layer
$n_s$=index of refraction of the substrate
2N+1=total number of layers in the stack
R=reflectance of the coating
T=transmittance of the coating From the above equation it follows that as the difference between $n_h$ and $n_l$ approaches zero, more layer pairs are required to achieve a given low transmittance. The bandwidth (BW) of the reflectance zone is given by:

$$BW = (4/\pi)\arcsin\left[(n_h/n_l - 1)/(n_h/n_l + 1)\right]. \quad (2)$$

Figure 2:
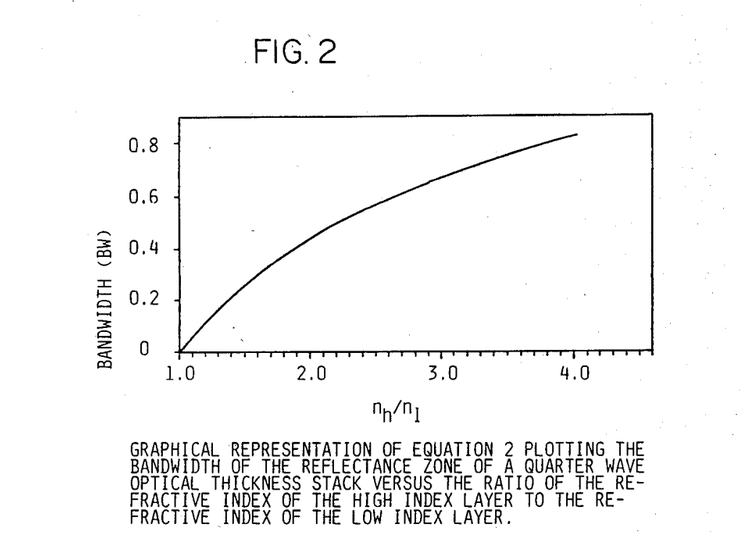
FIG. 2 is a graphical representation of an equation (equation 2 referred to in the specification) plotting the bandwidth of the reflectance zone of a quarter wave optical thickness stack versus the ratio of the refractive index of the high index layer to the refractive index of the low index layer. The numerals at the top of FIG. 2 indicate the primary lines at which an Argon ion laser can be made to lase in the blue/green spectrum.
Figure 3:
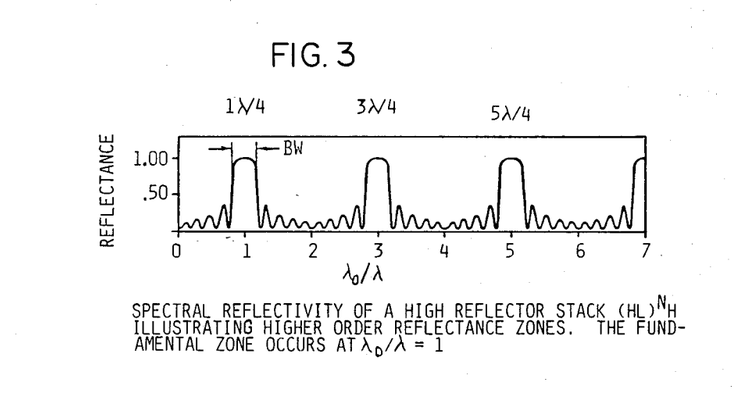
FIG. 3 is a graph of the spectral reflectivity of a high reflector stack $(HL)_{NH}$ illustrating higher order reflectance zones. The fundamental zone occurs at lambda sub zero/lambda equals 1 ($\lambda_0/\lambda = 1$).

From this equation we note that the bandwidth of a high reflectance coating is only a function of the two indices of refraction of the high and low index layers, and as the quantity ($n_h/n_l$) approaches unity, the bandwidth approaches zero. A graphical representation of this equation is illustrated in FIG. 2.

Also from thin film theory it is known that reflectance zones of such stacks exist at wavelengths where the layers are odd integral multiples ($N\lambda/4$ where $N=1,3,5,\ldots$) of a quarter-wave optical thickness ($\lambda/4$). Hence higher order reflectance zones occur at $\lambda_0/3, \lambda_0/5, \ldots$ for a structure with the fundamental reflectance zone centered at $\lambda_0$. The wavelength bandwidths of these higher order reflectance zones go as BW/3, BW/5, ... and so on. Hence, successively higher order zones produce successively narrower wavelength bandwidths. A coating stack designed with all layers $(2N+1)\lambda/4$ thick, where $N=0,1,2,3,\ldots$, will produce a wavelength bandwidth of $1/(2N+1)$ times a design with all quarter-waves ($\lambda/4$), e.g. the first higher order reflectance zone will have a wavelength bandwidth of $\frac{1}{3}$ of the fundamental reflectance zone.

To first order the output power (P) of a laser is given by equation 3:

$$P = P_{sat} T \left( \frac{G}{T + A} - 1 \right), \quad (3)$$

Where:
T=Mirror Transmittance
A=Sum of all other round trip losses in the laser cavity
G=Small signal gain of a given wavelength
$P_{sat}$=Saturation power, a constant for a given wavelength in a given laser.

For a multi-wavelength laser, this expression is appropriate for each wavelength with the provision that gain and saturation power may be and usually are different for each wavelength. Threshold for laser oscillation is defined as that condition for which the expression (in equation 3)

$$\left( \frac{G}{T+A} - 1 \right)$$

equals zero, or equivalently G=T+A.

If laser oscillation is supported at a give wavelength, then that wavelength is said to be above threshold, i.e. G>T+A. Alternately if laser oscillation at a given wavelength is not supported or is suppressed, then that wavelength is said to be below threshold, i.e. G<T+A.

In addition, the transmittance of the coating is said to be sufficient when oscillation at a given wavelength is suppressed, or in other words, such that the transmittance of the coating is greater than the optical gain at that wavelength. The relectance of the coating is said to be sufficient when oscillation at a given wavelength is supported, or in other words, such that the reflectance of the coating be greater than one minus the optical gain (1−G) at that wavelength.

The technical requirements of the wavelength selective output coupler for a nominal 20 milliwatt 488.0 internal mirror Argon ion gas laser are as follows. The primary spectral requirements are:

T≃2.0% at 488.0 nm, normal incidence
T>15.0% at 476.5 nm, normal incidence
T>10.0% at 496.5 nm, normal incidence
A<0.05% at 488.0 nm,
S<0.1% at 488.0 nm, where A=absorptance loss and S=scatter loss, with secondary requirements of sufficiently high transmittance for all other Argon ion laser lines in the blue/green spectrum in order to suppress oscillation. Environmental and durability requirements are also somewhat stringent. The coating must possess high ultraviolet radiation damage resistance in order to survive bore radiation generated by the plasma discharge. It must be capable of surviving lifetime requirements on the order of thousands of hours due to the fact this application is for internal mirror ion lasers and the frit seal prevents replacement of failed mirrors. Air/Vacuum and frit cycle shift of the center wavelength of the coating must be minimal in cycles from atmosphere to vacuum and from high temperature excursions of the frit cycle in order to predict repeatability. The coating must also be capable of surviving mirror seal frit cycles on the order of 465 degrees Centigrade. After these cycles the coating must not degrade, crack, craze or peel and must continue to meet all technical specifications.

We have found that a coating consisting of 33 3λ/4 thick layers of the format S, (HL)$^N$H, Vacuum where N=16 of Aluminum Oxide (H) and Silicon Dioxide (L) meets the above requirements. The refractive index of $Al_2O_3$ at 488.0 nanometers is approximately 1.676 and the refractive index of $SiO_2$ is approximately 1.448. From calculations using Equation 1 we find the transmittance of the coating on BK-1 ($n_s$=1.522) optical glass to be 2.0%. The bandwidth (BW) calculation (Equation 2) yields 3.1% or 15.0 nanometers at 488.0 nanometers. This bandwidth is adequate for the simultaneous suppression of 476.5 nanometers and 496.5 nanometers as well as all other closely spaced adjacent lines in the blue/green spectrum. See FIG. 4 for the computed spectral curve. In laser testing to date the coating has not degraded, peeled or crazed in frit cycles to 500 degrees Centigrade. The coating shifts an average of 0.7 to 1.0 nanometers shorter as the coating is subjected to the frit cycles and the partial vacuum environment of the laser tube. This shift has been highly consistent and repeatable so the coating manufacturer can center the coating accordingly. Also in testing, no degradation of the coating due to the plasma discharge or ultraviolet radiation has been observed over 5000 hours of continuous operation of laser tubes.

While this invention has been disclosed in detail immediately above for operation of an Argon ibn gas laser at the 488.0 nm line, the invention can also be used for operation of the Argon ion gas laser at other spectral lines (e.g., the 457.9, 476.5, 514.5, 351.1 and 363.8 nm lines) and can also be used for narrow bandwidth wavelength selection operation of other lasers, such as, for example, Krypton lasers, YAG rod or slab lasers, solid state lasers and ring or dye lasers.

Figure 5:
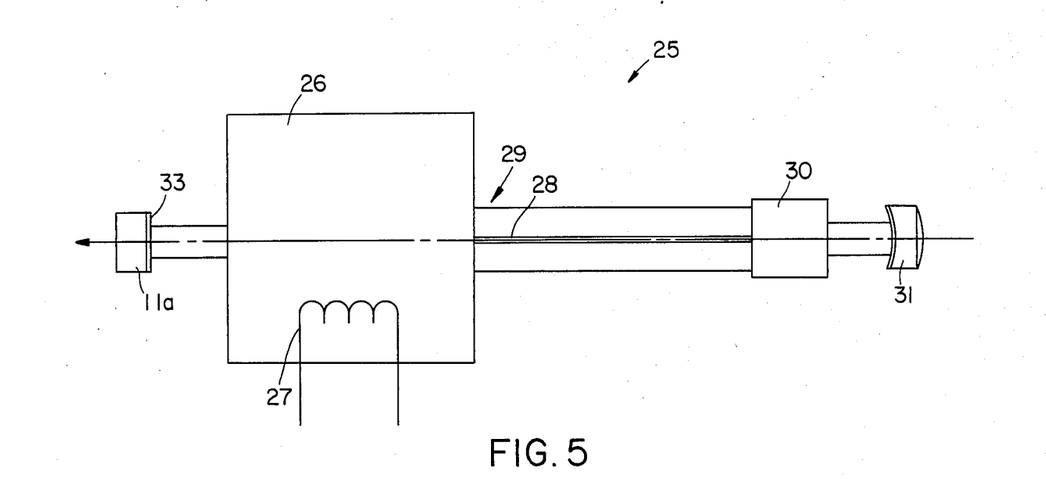
FIG. 5 is a diagrammatic cross-sectional view of a typical Argon ion gas laser tube construction with internal end mirrors, at least one of which has a wavelength selective optical interference coating in accordance with the principles of the invention.
Figure 6:
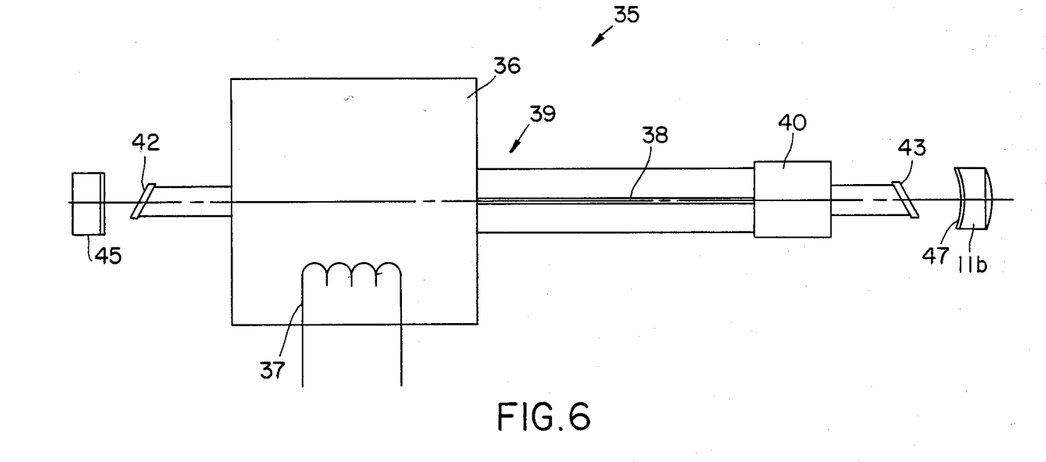
FIG. 6 is a diagrammatic cross-sectional view of a typical gas laser tube construction with external end mirrors, at least one of which has a wavelength selective optical interference coating in accordance with the principles of the invention. The plasma enviroment of the laser is isolated from the mirror surface by a laser window in this embodiment of the invention.

FIGS. 5 and 6 illustrate the wavelength selective optical coatings of the invention on mirrors within a laser cavity and exterior to a laser cavity, respectively. In these figures the invention is illustrated in the context of gas lasers.

In FIG. 5 a typical Argon ion gas laser 25 is shown, including a gas reservoir 26, a filament cathode 27, laser bore 28 of a laser cavity 29, and an anode 30. A high reflector mirror 31 is positioned at the anode end of the laser cavity 29, and an output coupler mirror 11a is positioned at the output end of the laser cavity, The mirror 11a is as described above, particularly with reference to the mirror 11 of FIG. 1. That is, the mirror 11a has a coating 33 comprising the wavelength selective coatings illustrated in FIG. 1 and described above.

Thus, in FIG. 5 the invention is illustrated in the context of internal laser end mirrors, at least one of which has the ultra-narrow bandwith coatings of the invention. Both the mirrors 11a and 31 can include the wavelength selective coatings if desired.

FIG. 6 illustrates an external end mirror laser 35, including a gas reservoir 36, a filament cathode 37, a laser bore 38 within a laser cavity 39, and an anode 40. Laser windows 42 and 43 seal the laser cavity 39 at both ends. External mirrors 45 and 11b are positioned at either end, external to the laser cavity 39. The mirror 45 is a high reflector mirror, and the mirror 11b has a wavelength selective coating 47 in accordance with the invention, again similar to what is illustrated and described with respect to FIG. 1.

In the embodiment of FIG. 6, the plasma enviroment of the laser cavity 39 is isolated from the surface of the mirror 11b by the laser window 43. This is one example of several combinations which can be made with internal and external mirror surfaces, or using either the cathode or the anode end for the wavelength selective mirror.

The laser structures shown in both FIGS. 5 and 6 can be in the context of an Argon ion gas laser or a Krypton ion gas laser, for example.

FIGS. 7 through 11 clarify and explain by way of example the unique characteristics of the present invention.

Figure 7:
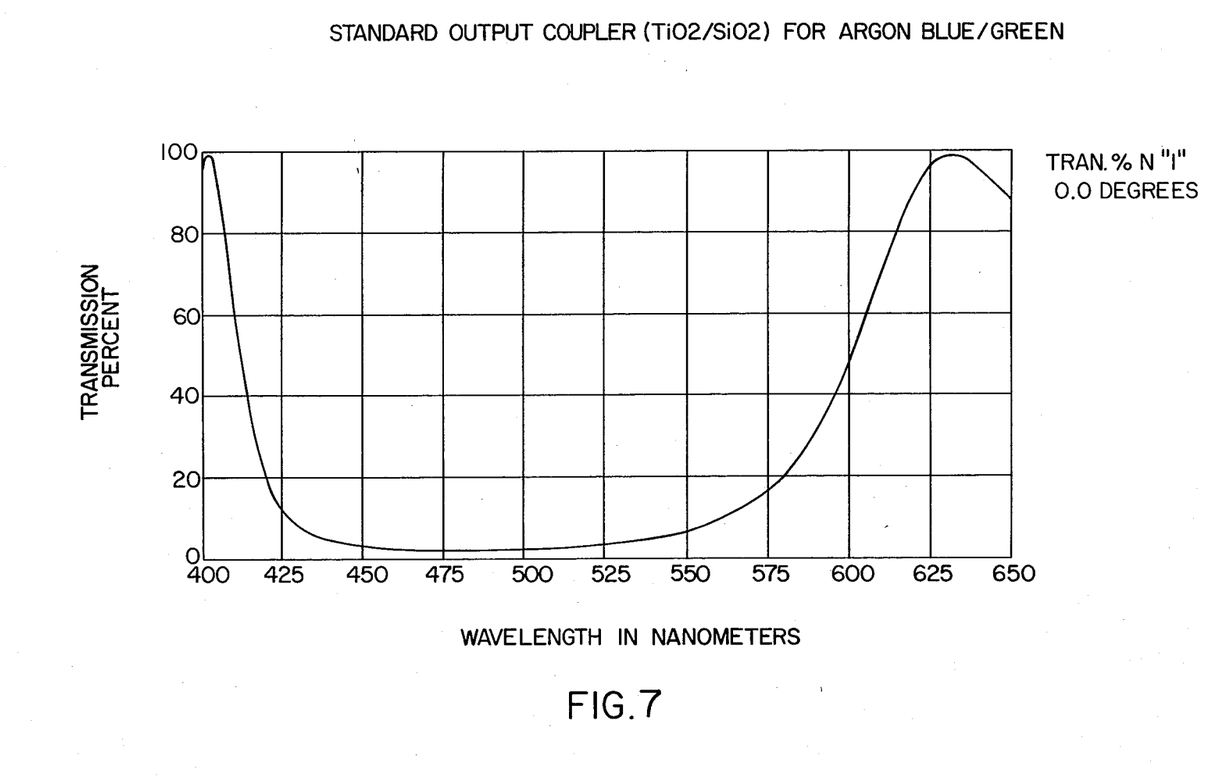
FIG. 7 is a graph showing the broadband transmission characteristics of a conventional broadband mirror.

FIG. 7 shows the broadband transmission characteristics of a conventional broadband mirrior.

Figure 4:
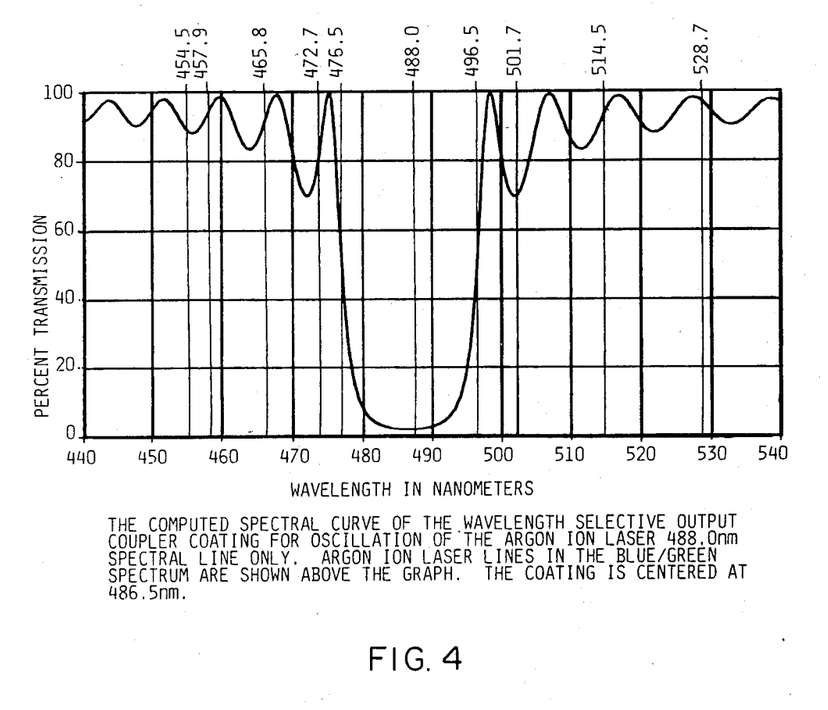
FIG. 4 is a graph showing the computed spectral curve of the wavelength selective output coupler coating for oscillation of the Argon ion laser 488.0 nanometer spectral line only.

FIG. 4 illustrates the same characteristics for ultra-narrow bandwidth coating utilized with the present invention.

Figure 8:
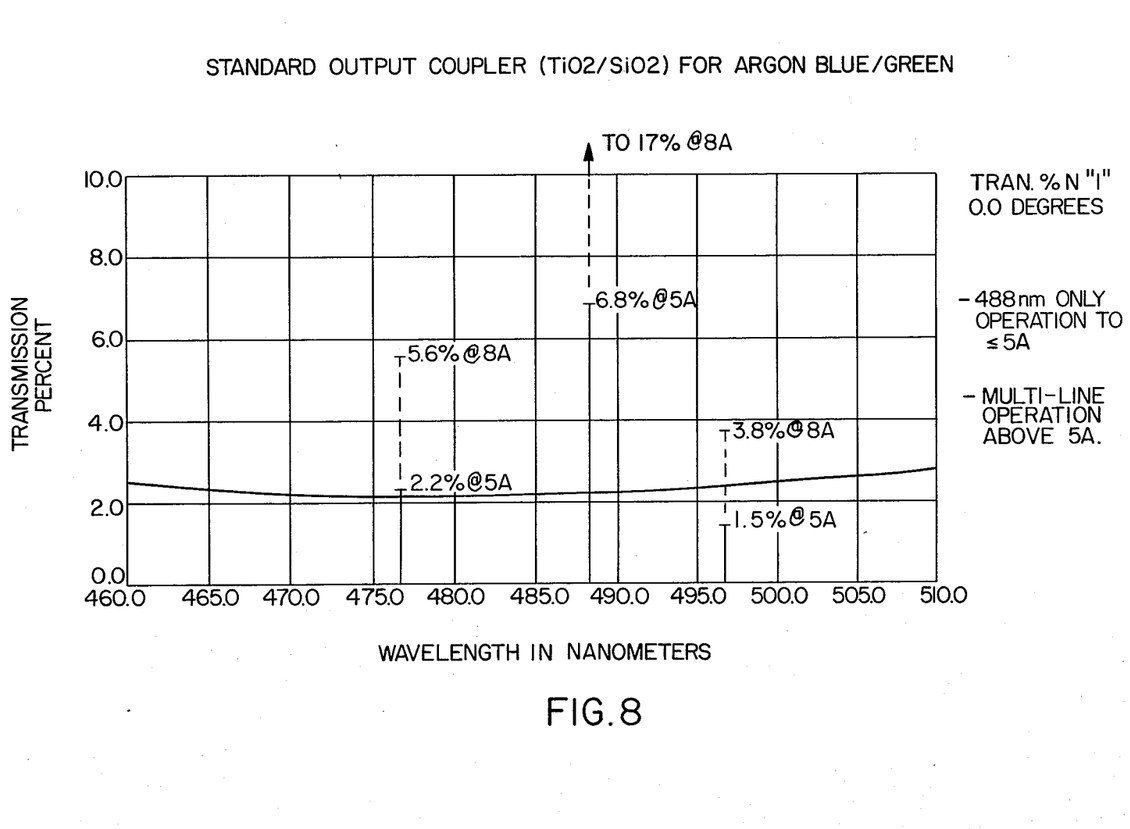
FIG. 8 is a graph showing the performance characteristics of a small Argon Ion laser using a conventional output coupler.
Figure 9:
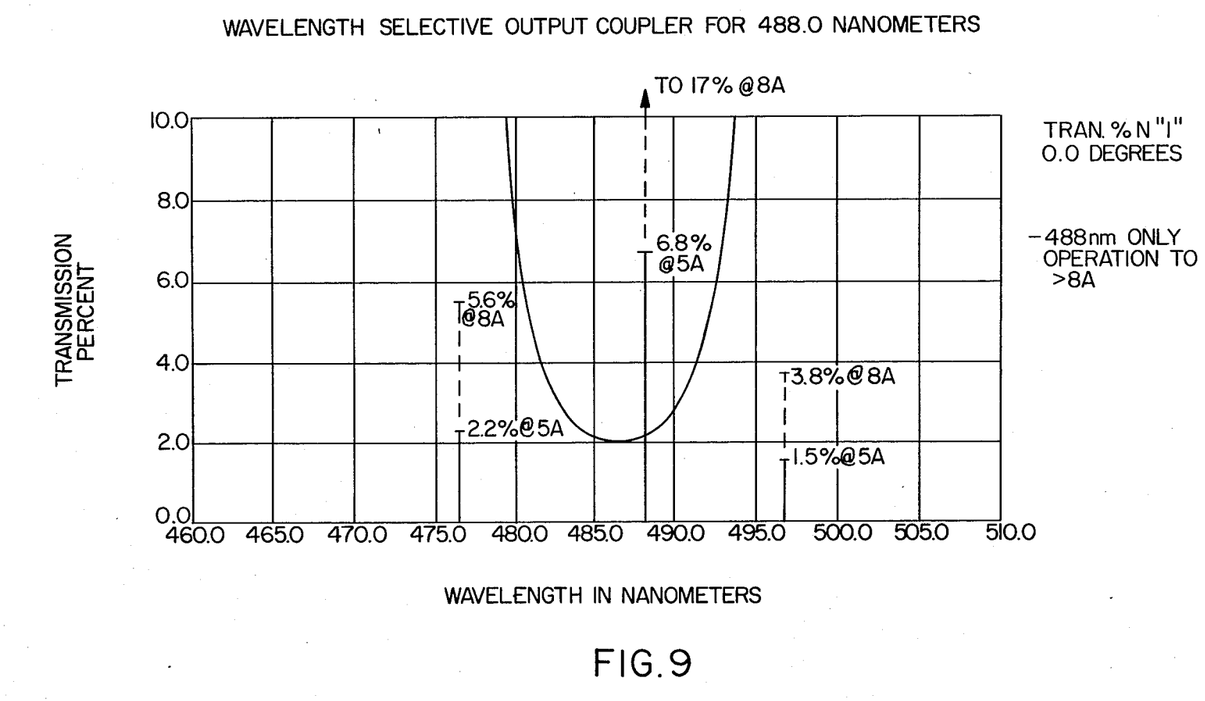
FIG. 9 is a graph showing the performance characteristics of a small Argon laser using a wavelength selective output coupler using the present invention.

Optical gain information is summarized and displayed in FIGS. 8 and 9. In FIG. 8, a standard output coupler is employed. While in FIG. 9, a wavelength selective output coupler employed in accordance with the present invention is utilized. In both figures, the laser operating at 5 Amps is illustrated as a solid line, and operating at 8 Amps illustrated as a dotted line. In FIG. 6, it can be seen that while the laser is operating at 5 Amps it is above threshold and oscillates at 488.0 nm, slightly above threshold and oscillating at 476.5 nm, and below threshold and not oscillating at 496.5 nm. At 8 Amps, all three wavelengths have gains greater than their respective mirror transmissions, and all three wavelengths are above threshold and oscillating.

The same optical gain data is displayed in FIG. 9, showing transmission characteristics for a mirror in accordance with the present invention. For a laser using this mirror, only the 488.0 nm wavelength has gain greater than the mirror transmission at 5 Amps. Thus, only this line is above threshold and oscillating. The same is true at 8 Amps.

Figure 10:
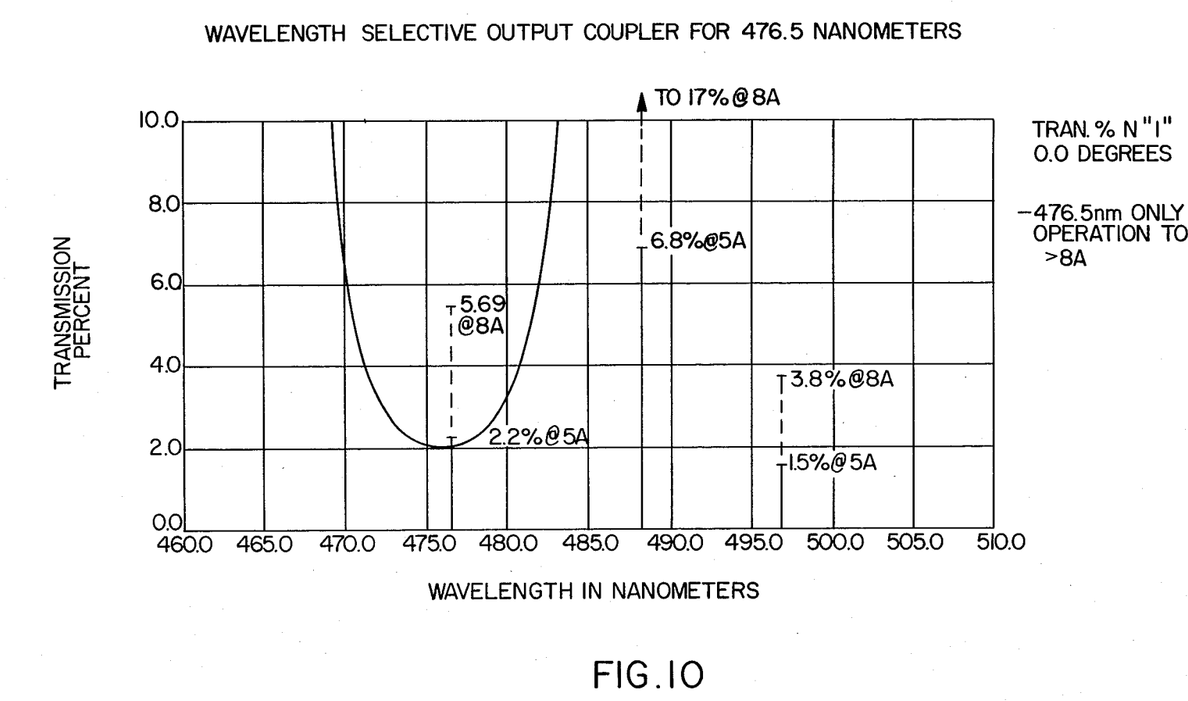
FIG. 10 is a graph showing that by selecting the appropriate choice of the minimum transmission wavelength of the mirror coating, as embodied in the present invention, weaker wavelengths can be made to oscillate while high gain wavelengths are held blow threshold. Specifically, 476.5 nm is only oscillating at 5 Amps and 488.0 nmis below threshold.
Figure 11:
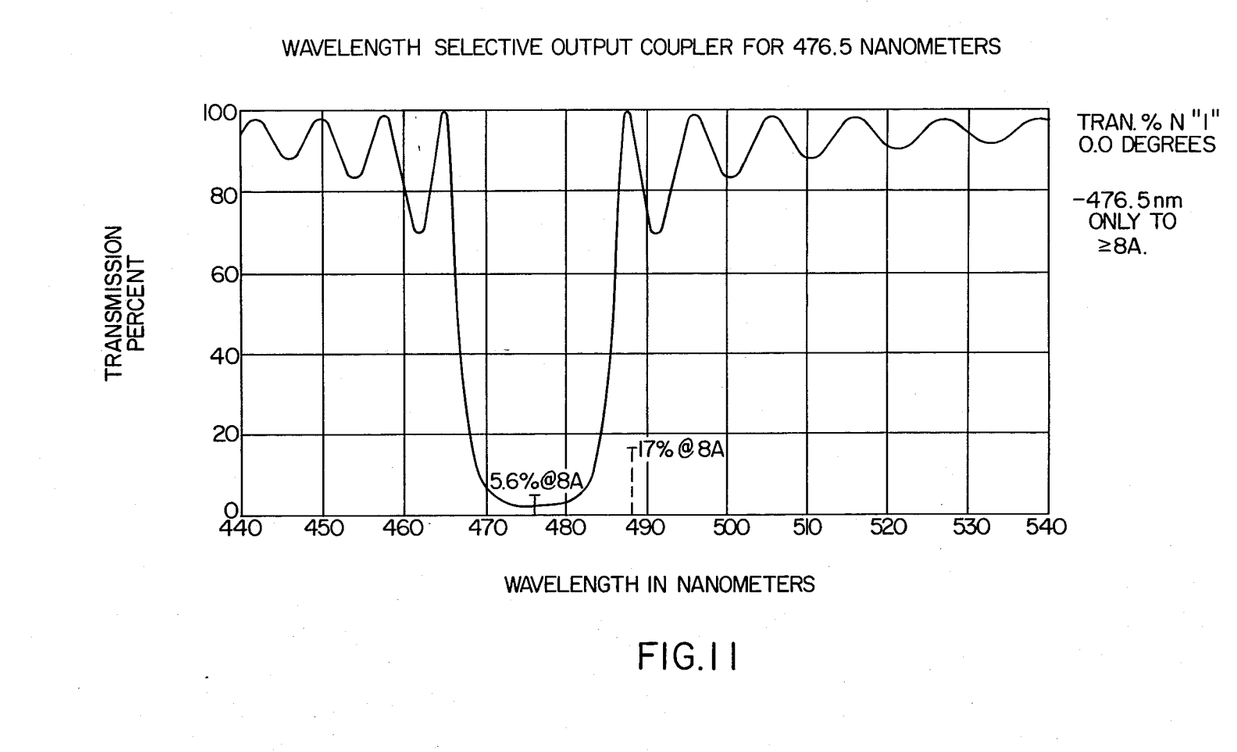
FIG. 11 is a graph similar to FIG. 10 illustrating application of the present invention where weaker wavelengths are made to oscillate while high gain wavelengths are held below threshold. Specifically, 476.5 nm is oscillating at 8 Amps and 488.0 nm is below threshold.

By appropriate choice of the minimum transmission wavelength of the mirror coating illustrated in FIG. 4, any other wavelength can be selected to oscillate in any and all other wavelengths can be held below threshold. Examples are illustrated in FIGS. 10 and 11. In FIG. 10 only the 476.5 nm wavelength is oscillating at 5 Amps, and the 488.0 nm wavelength is below threshold. In FIG. 11, the 476.5 nm wavelength is oscillating at 8 Amps, and the 488.0 nm wavelength is below threshold.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A laser of the kind which can oscillate on more than one wavelength simultaneously, said laser comprising,
    a single resonant optical cavity,
    an optical gain medium,
    at least two reflective mirrors delimiting the optical cavity, and
    coating means on at least one mirror surface for providing operation of said laser at any selected single or band of wavelengths, including any weak or low gain wavelengths, independent of their optical gains and at substantially any current or power level while suppressing non-selected wavelengths such that, said coating adjusts thresholds of all selected and non-selected wavelengths, including any dominant or high gain wavelengths, said coating having a coating reflectance to support laser oscillation for said selected single or band of wavelengths such that said selected single wavelength or band of wavelengths are above threshold, said coating further having a coating reflectance to suppress laser oscillation at said non-selected wavelengths, including dominant or high gain wavelengths, such that said non-selected wavelengths are below threshold.

2. The invention defined in claim 1 wherein the coating means provide single wavelength operation of the laser by allowing oscillation of one line while suppressing oscillation of closely spaced adjacent lines.

3. The invention defined in claim 2 wherein the coating means have spectral characteristics sufficiently narrow to allow oscillation of said one line by providing the appropriate optical reflectance for oscillation of said one line and to suppress oscillation of said closely spaced adjacent lines by providing the necessary optical transmittance through the mirror in order to suppress oscillation at the wavelengths corresponding to said closely spaced adjacent lines.

4. The invention defined in claim 1 wherein the laser is an internal mirror gas laser and at least one mirror has an internal surface exposed to a plasma environment within the cavity of the gas laser.

5. The invention defined in claim 1 wherein at least one laser mirror is external to a plasma environment within the laser.

6. The invention defined in claim 1 wherein the laser is an Argon ion gas laser and the coating means provide appropriate reflectance for oscillation of one of the following:
    a. 457.9 nanometers;
    b. 476.5 nanometers;
    c. 488.0 nanometers;
    d. 514.5 nanometers;
    e. 351.1 nanometers;
    f. 363.8 nanometers.

7. The invention defined in claim 1 where the laser is a Krypton ion gas laser.

8. The invention defined in claim 1 wherein the coating means comprise multilayer stacks of dielectric materials of alternating high and low refractive index values which reflect over a fairly narrow bandwidth.

9. The invention defined in claim 8 wherein the wavelength bandwidth of the coating stack is a function of the order of the reflectance zone and the optical thickness of each individual layer.

10. The invention defined in claim 9 wherein the laser is an Argon ion gas laser, the coating means are constructed to provide single wavelength operation at 488.0 nanometers, and the coating means comprise alternating layers of aluminum oxide ($Al_2O_3$) and silicon dioxide ($SiO_2$).

11. The invention defined in claim 1 wherein the coating means comprise dielectric materials having differences in optical indices of refraction effective to determine the narrow width of the reflectance band.

12. The invention defined in claim 11 wherein said dielectric materials can survive the sustained high temperatures required for hard sealing the mirror to the associated cavity structure without fracture, re-evaporation from the substrate or other degradation to the optical or physical characteristics of the coating.

13. The invention defined in claim 12 wherein said dielectric materials can survive the vacuum environment and ultraviolet radiation coming from the arc discharge in plasma tubes of gas lasers without degradation to the optical or physical characteristics of the coating.

14. The invention defined in claim 13 wherein the coating means comprise layers of aluminum oxide ($Al_2O_3$) and silicon dioxide ($SiO_2$).

15. A method of producing single wavelength operation of a laser of the kind which can oscillate on a number of lines simultaneously, at substantially any input power level, said method comprising,
    coating a mirror surface with a coating having optical characteristics which provide for operation of said laser at any selected single or band of wavelengths, including any weak or low gain wavelengths, independent of their optical gains and at substantially any current or power level while suppressing non-selected wavelengths such that, said coating adjusts thresholds of all selected and non-selected wavelengths, including any dominant or high gain wavelengths, said coating having a coating reflectance to support laser oscillation for said selected single or band of wavelengths such that said selected single wavelength or band of wavelengths are above threshold, said coating further having a coating reflectance to suppress laser oscillation at said non-selected wavelengths, including dominant or high gain wavelengths, such that said non-selected wavelengths are below threshold,
    mounting the mirror with respect to an optical cavity of the laser in a position where the mirror coating is effective to allow oscillation for said selected single or band of wavelengths, and
    operating the laser at a high input power level, above a threshold at which the laser would otherwise begin to oscillate a number of lines simultaneously.

* * * * *

REEXAMINATION CERTIFICATE (1291st)

United States Patent [19]
von Gunten et al.

[11] B1 4,615,034
[45] Certificate Issued May 29, 1990

[54] ULTRA-NARROW BANDWITH OPTICAL THIN FILM INTERFERENCE COATING FOR SINGLE WAVELENGTH LASERS

[75] Inventors: Marc K. von Gunten; Benjamin H. Cook, both of San Jose; David C. Gerstenberger, Mountain View, all of Calif.

[73] Assignee: Spectra-Physics, Inc.

Reexamination Request:
No. 90/001,785, Jun. 13, 1989

Reexamination Certificate for:
Patent No.: 4,615,034
Issued: Sep. 30, 1986
Appl. No.: 595,296
Filed: Mar. 30, 1984

[51] Int. Cl.$^5$ ................................. H01S 3/08
[52] U.S. Cl. .................... 372/99; 372/55; 372/108; 372/23; 350/166
[58] Field of Search ............ 372/99, 108, 55, 23, 372/98; 350/166, 164

[56] References Cited

U.S. PATENT DOCUMENTS

| | | | |
|---|---|---|---|
| 3,853,386 | 12/1974 | Ritter et al. | 350/164 |
| 4,147,409 | 4/1979 | Apfel | 350/164 |
| 4,309,075 | 1/1982 | Apfel et al. | 350/164 |
| 4,358,851 | 11/1982 | Scifres et al. | 372/97 |
| 4,373,782 | 2/1983 | Thelen | 350/166 |
| 4,482,209 | 11/1984 | Grewal et al. | 350/642 |
| 4,545,646 | 10/1985 | Chern et al. | 350/162.2 |
| 4,615,033 | 9/1986 | Nakano et al. | 372/99 |

FOREIGN PATENT DOCUMENTS

| | | |
|---|---|---|
| 57-202791 | of 0000 | Japan . |
| 1230914 | of 0000 | United Kingdom . |
| 1523332 | of 0000 | United Kingdom . |
| 1557362 | of 0000 | United Kingdom . |
| 2091439 | of 0000 | United Kingdom . |

OTHER PUBLICATIONS

E. Rudisill et al., "Dichroic Mirrors for High Energy DF Lasers", IEEE J. Quant. Electron., Sep., 1977, p. 85.

"Handbook of Lasers with Selected Data on Optical Technology", edited by R. Pressley, Ph.D., published by The Chemical Rubber Co., Cleveland, Ohio, 1971.

*Primary Examiner*—Léon Scott, Jr.

[57] ABSTRACT

A wavelength selective mirror provides single wavelength operation of a gas laser. In a specific embodiment an output coupler optical interference coating allows oscillation of the 488.0 nanometer line of the Argon ion laser blue/green spectrum while suppressing all other lines in that spectrum, particularly adjacent lines at 476.5 nanometers and 496.5 nanometers.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 7, 10 and 12–14 is confirmed.

Claims 1–5, 8, 9, and 11 are cancelled.

Claim 15 is determined to be patentable as amended.

New claims 16–18 are added and determined to be patentable.

15. A method of producing single wavelength operation of [a] *an ion* laser of the kind which can oscillate on a number of lines simultaneously, at substantially any input power level, said method comprising,
  coating a mirror surface with a coating having optical characteristics which provide for operation of said *ion* laser at any selected single or band of wavelengths, including any weak or low gain wavelengths, independent of their optical gains and at substantially any current or power level while suppressing non-selected wavelengths such that, said coating adjusts thresholds of all selected and non-selected wavelengths, including any dominant or high gain wavelengths, said coating having a coating reflectance to support laser oscillation for said selected single or band of wavelengths such that said selected single wavelength or band of wavelengths are above threshold, said coating further having a coating reflectance to suppress laser oscillation at said non-selected wavelengths, including dominant or high gain wavelengths, such that said non-selected wavelengths are below threshold,
  mounting the mirror with respect to an optical cavity of the laser in a position where the mirror coating is effective to allow oscillation for said selected single or band of wavelengths, and
  operating the laser at a high input power level, above a threshold at which the laser would otherwise begin to oscillate a number of lines simultaneously.

*16. An ion laser of the kind which can oscillate on more than one wavelength simultaneously, said ion laser comprising,*
  *a single resonant optical cavity,*
  *an optical gain medium,*
  *at least two reflective mirrors delimiting the optical cavity, and*
  *coating means on at least one mirror surface for providing operation of said ion laser at any selected single or band of wavelengths, including any weak or low gain wavelengths, independent of their optical gains and at substantially any current or power level while suppressing non-selected wavelengths such that, said coating adjusts thresholds of all selected and non-selected wavelengths, including any dominant or high gain wavelengths, said coating having a coating reflectance to support laser oscillation for said selected single or band of wavelengths such that said selected single wavelength or band of wavelengths are above threshold, said coating further having a coating reflectance to suppress laser oscillation at said non-selected wavelengths, including dominant or high gain wavelengths, such that said non-selected wavelengths are below threshold.*

*17. An ion laser of the kind which can oscillate on more than one wavelength simultaneously, said ion laser comprising*
  *a single resonant optical cavity,*
  *an optical gain medium,*
  *at least two reflective mirrors delimiting the optical cavity, and*
  *coating means on at least one mirror surface comprising alternating layers of dielectric materials having high and low refractive indices, said coating means providing operation of said laser at a single or band of wavelengths, selection of said single or band of wavelengths depending on the optical width and refractive indices of said layers, but being independent of the optical gain of said wavelength or band of wavelengths and being substantially independent of the ion laser current or power level, said coating means suppressing non-selected wavelengths such that, said coating adjusts the thresholds of all wavelengths, including any dominant or high gain wavelengths, said coating having a coating reflectance to support laser oscillation for said provided single or band of wavelengths such that said provided wavelength or band of wavelengths are above threshold, said coating further having a coating reflectance to suppress laser oscillation at said non-selected wavelengths, including dominant or high gain wavelengths, such that non-selected wavelengths are below threshold.*

*18. The invention defined in claim 17 wherein said mirror reflects light at a selected wavelength, said wavelength falling within a higher order reflectance zone.*

* * * * *